US009174289B2

(12) United States Patent
Ginocchini et al.

(10) Patent No.: US 9,174,289 B2
(45) Date of Patent: Nov. 3, 2015

(54) SAW

(71) Applicant: Black & Decker Inc., Newark, DE (US)

(72) Inventors: Lucio Ginocchini, Perugia (IT);
Marcello Bettacchini, Perugia (IT);
Mirco Rossetti, Perugia (IT)

(73) Assignee: Black & Decker Inc., Newark, DE (US)

( * ) Notice: Subject to any disclaimer, the term of this patent is extended or adjusted under 35 U.S.C. 154(b) by 221 days.

(21) Appl. No.: 13/947,309

(22) Filed: Jul. 22, 2013

(65) Prior Publication Data

US 2014/0020539 A1  Jan. 23, 2014

(30) Foreign Application Priority Data

Jul. 23, 2012 (GB) .................................. 1213061.3

(51) Int. Cl.
*B23D 45/04* (2006.01)
*B23D 47/12* (2006.01)

(52) U.S. Cl.
CPC ............ *B23D 45/046* (2013.01); *B23D 45/048* (2013.01); *B23D 47/12* (2013.01); *Y10T 83/7693* (2015.04)

(58) Field of Classification Search
CPC .... B23D 47/12; B23D 47/126; B23D 45/046; B23D 45/048
USPC ..................... 83/490, 485–489, 491
See application file for complete search history.

(56) References Cited

U.S. PATENT DOCUMENTS

| 2006/0042442 A1* | 3/2006 | Ushiwata et al. ............... 83/473 |
| 2006/0081104 A1 | 4/2006 | Wang |
| 2008/0011140 A1* | 1/2008 | Choi .............................. 83/491 |
| 2013/0055873 A1 | 3/2013 | Cox |

FOREIGN PATENT DOCUMENTS

| DE | 19805857 A1 | 10/1998 |
| EP | 1256407 A1 | 11/2002 |
| EP | 1604764 A1 | 12/2005 |
| EP | 1632324 A1 | 3/2006 |
| EP | 1878525 A1 | 1/2008 |

OTHER PUBLICATIONS

Ronald Popma, European Search Report, Nov. 7, 2013, The Hague. Annex to the European Search Report on European Patent Application No. EP 13 17 5583.

* cited by examiner

*Primary Examiner* — Ned Landrum
*Assistant Examiner* — Liang Dong
(74) *Attorney, Agent, or Firm* — Adan Ayala (57) ABSTRACT

A saw has a base assembly, a saw assembly pivotally mounted on the base assembly, a motor mounted within the saw assembly, and a drive spindle rotatably driven by the motor via a drive mechanism. The drive mechanism has a rotatable output shaft, a first drive wheel mounted on the output shaft, a rotatable intermediate shaft, a first driven wheel mounted on the intermediate shaft, a first drive belt wrapped around the first drive wheel and first driven wheel for transfer rotary motion of the output shaft to the intermediate shaft, a second drive wheel mounted on the intermediate shaft, a second driven wheel mounted on the drive spindle, and a second drive belt wrapped around the second drive wheel and second driven wheel for transferring rotary motion of the intermediate shaft to the drive spindle.

9 Claims, 12 Drawing Sheets

SAW

FIELD OF THE INVENTION

The present invention relates to saws and in particular to sliding compound miter saws.

BACKGROUND

Sliding compound miter saws comprise a motor unit pivotally mounted on a base. The motor unit is located above the base and can pivot between a high position where it is located furthermost away from the base to a low position where a circular saw blade, which is mounted on the motor unit and which is capable of being rotationally driven by a motor located within the motor unit, can engage with a work piece located on the base. A spring biases the motor unit to its uppermost position.

Such saws have a sliding feature wherein the motor unit, in addition to be able to perform a pivotal or chopping movement, can slide linearly across the base to perform a slide cut. Furthermore, these types of saw include mechanisms by which they are able to perform miter and bevel cuts on work pieces located on the base.

These types of saw comprise guards which surround the edge of the saw blade in order to prevent the operator from touching the cutting edge. Typically, such saws comprise a fixed guard which surrounds the cutting edge of the top half of the cutting blade and a pivotal guard which is capable of surrounding the cutting edge of the lower half of the cutting blade. The pivotal guard is capable of being pivoted from a first position where it surrounds the cutting edge of the lower half of the cutting blade to a retracted position where the cutting edge of the lower half of the cutting blade is exposed so that the cutting blade can be used to cut a work piece. The purpose of the pivotal guard is to enable the cutting edge of the lower half of the circular saw blade to be surrounded when the saw blade is not being used to provide protection to the operator while allowing the cutting edge of the lower half of the circular saw blade to be exposed when it is required to perform the cutting function.

EP1772221 describes one example of a sliding compound miter saw.

Figure 1:
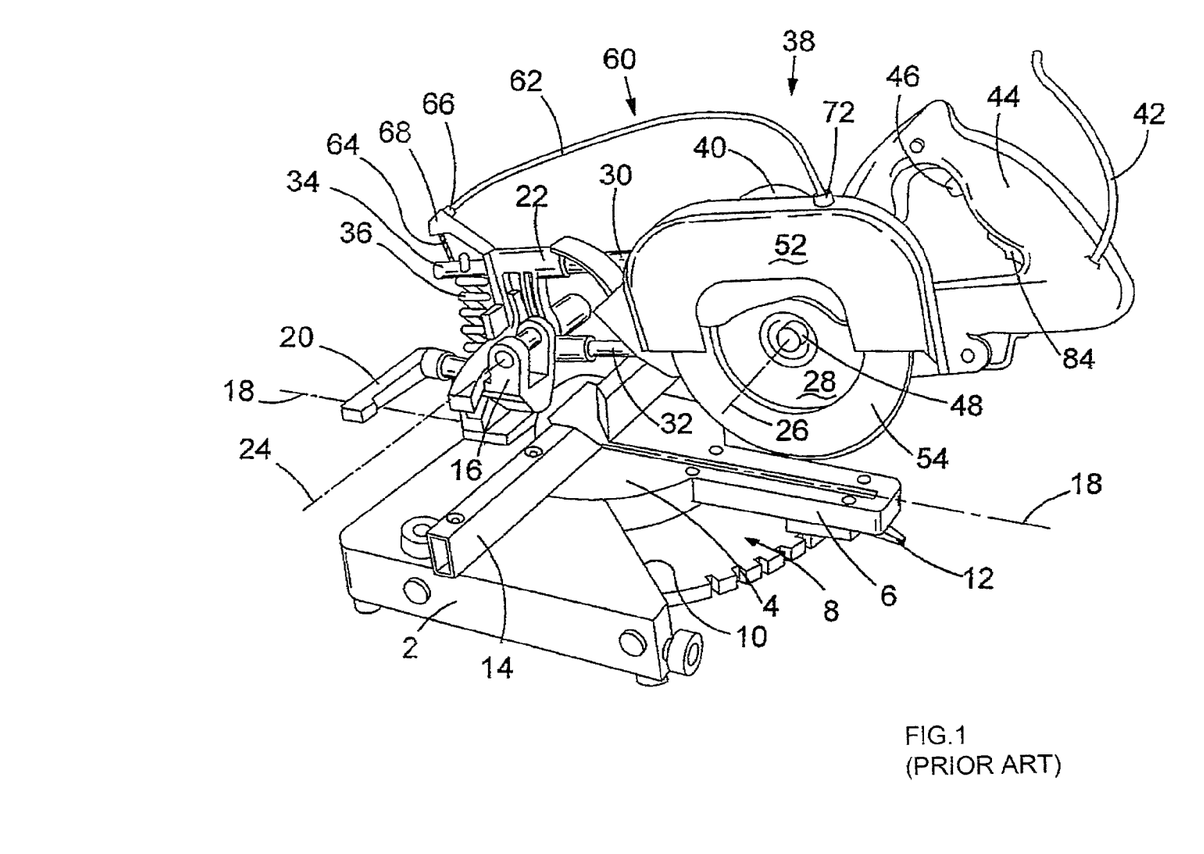
FIG. 1 shows a perspective view of a prior art design of saw as disclosed in EP1772221.
Figure 2A:
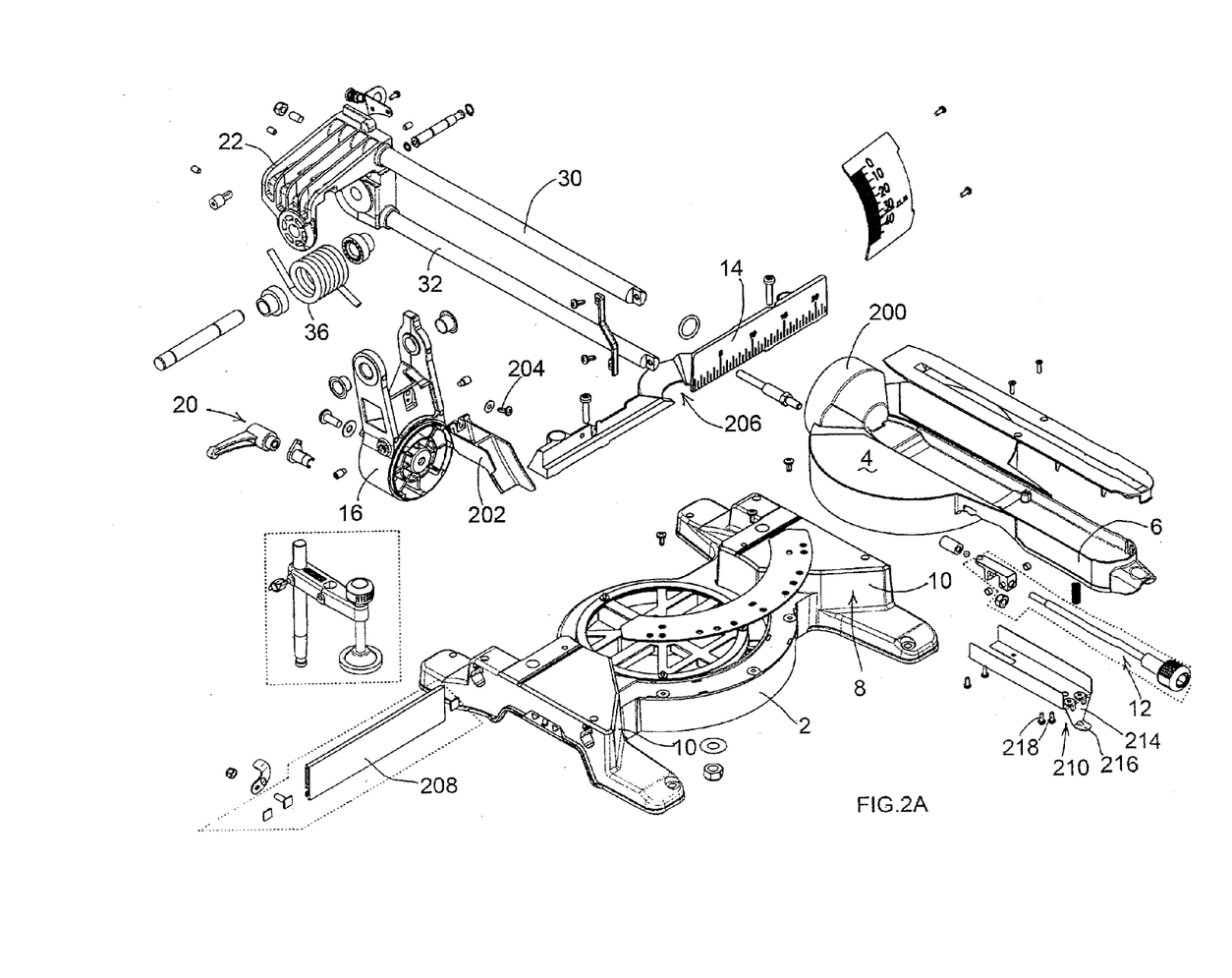
FIGS. 2A and 2B show an exploded view of an embodiment of the saw according to the present invention.
Figure 2B:
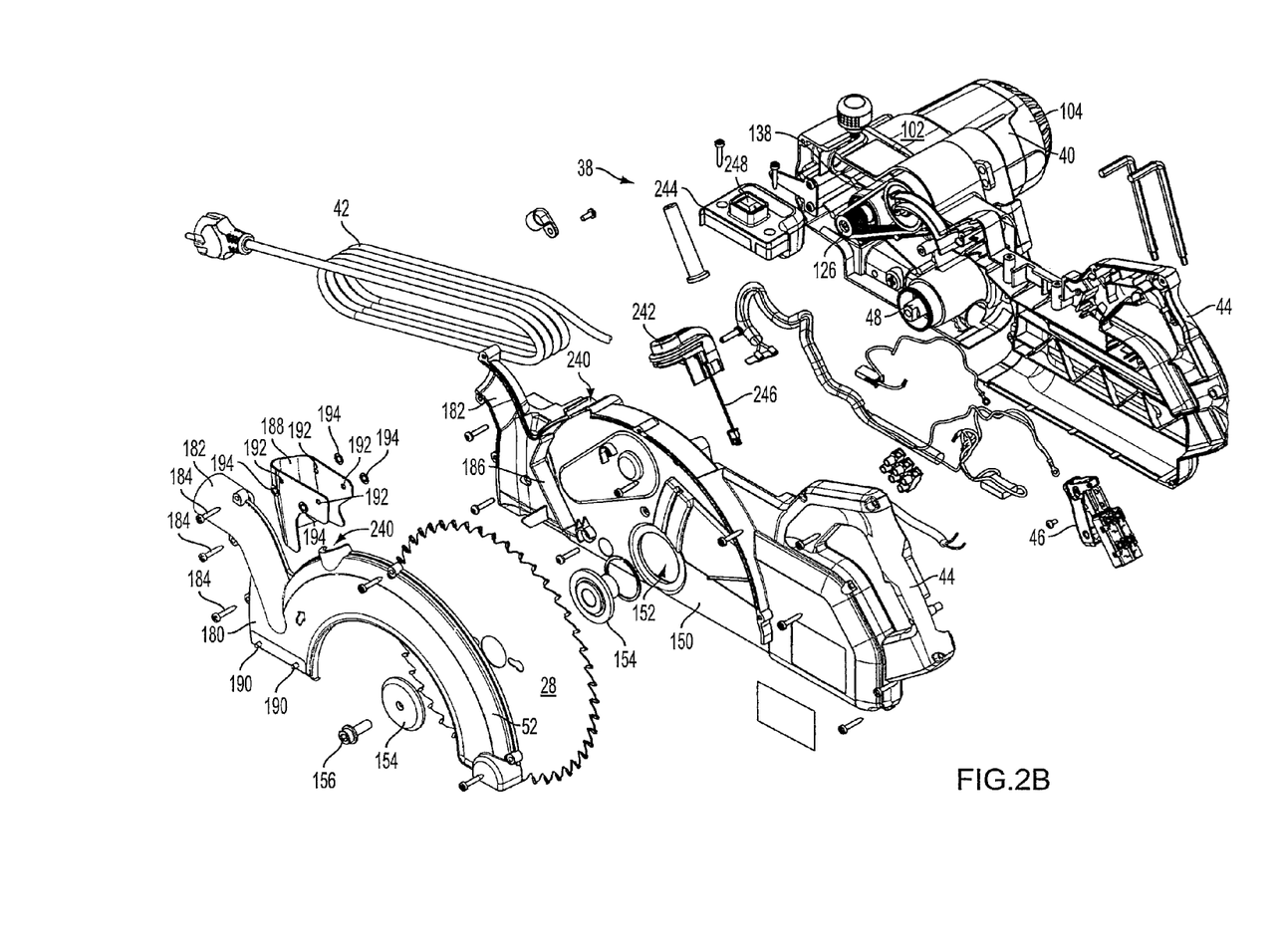

Referring to FIG. 1, the saw described in EP177221 comprises a base 2 in which is mounted a circular table 4. The circular table 4 can rotate about a vertical axis. An arm 6 is attached to the front of the circular table 4 which extends through a recess 8 formed in the front of the base 2 and then forward of the base 2. As the circular table rotates, the arm 6 swings within the recess 8, the maximum amount of pivotal movement being limited by the sides 10 of the recess 8. A latch 12 is attached to the underside of the end of the arm 6 which is capable of releasably locking the angular position of the arm 6 within the recess 8. A fence 14 is rigidly attached to the base 2 and passes over the circular table 4.

Pivotally attached to the rear of the circular table 4 is a bevel support 16. The bevel support 16 can pivot about a horizontal bevel axis 18. The bevel support 16 can be locked in a range of angular positions relative to the circular table 4 using a locking handle 20.

Pivotally mounted onto the bevel support 16 is a slide support 22. The slide support 22 can pivot about a chopping axis 24 which is parallel to the axis of rotation 26 of a cutting blade 28.

Rigidly mounted within the slide support 22 are the ends of two straight rods 30; 32. The rods 30; 32 are prevented from sliding or rotating within the slide support 22. The rods 30, 32 are located one above the other and are parallel to each other. Attached to the end 34 of the top rod 30 is a spring 36. The other end of the spring 36 is attached to the bevel support 16. The spring 36 is under tension, biasing the end 34 of the top rod 30 downwardly, biasing the ends of the two rods 30, 32 located remotely from the slide support 22 upwardly due to the pivotal connection of the slide support 22 to the bevel support 16.

Slideably mounted onto the two rods 30, 32 is a saw assembly 38. The saw assembly 38 comprises a motor housing 40 in which is mounted an electric motor. The electric motor is powered via an electric cable 42. Mounted on the front of the motor housing 40 is a handle 44. A trigger switch 46 is mounted within the handle 44, which when depressed, activates the motor. A drive spindle 48 projects from the housing 40. A circular saw blade 28 is rigidly mounted onto the drive spindle 48. When the motor, is activated, the drive spindle rotates, rotatingly driving the saw blade 28. A fixed guard 52 is rigidly mounted onto the motor housing 40 and surrounds the top cutting edge of the saw blade 28. A pivotal guard 54 is pivotally mounted on the motor housing 40 and can pivot about the axis of rotation 26 of the saw blade 28. The pivotal guard 54 can pivot between an enclosed position where it surrounds the lower cutting edge of the saw blade 28 and a retracted position where it exposes the lower cutting edge of the saw blade 28. When the pivotal guard is in the retracted position, it is telescopically pivoted into the fixed guard 52. A pivotal guard spring biases the pivotal guard 54 to the enclosed position.

The saw assembly 38 can slide along the two rods 30, 32 towards or away from the slide support 22.

In use, a work piece is placed on the base 2 and circular table 4 against the fence 14. The pivotal movement of the circular table 4 about the vertical axis allows the saw to perform miter cuts on the work piece. The pivotal movement of the bevel support 16 in relation to the circular table 4 about the bevel axis 18 allows the saw to perform bevel cuts on the work piece. The pivotal movement of the slide support 22 on the bevel support 16 about the chopping axis 24 allows the saw to perform chop cuts on the work piece. The sliding movement of the saw assembly 38 along the two rods 30, 32 allows the saw to perform sliding cuts on the work piece.

The saw comprises a pivotal guard actuating mechanism. The pivotal guard actuating mechanism causes the pivotal guard to pivot to its retracted position when the saw assembly is pivoted about the chopping axis 24 from its upper position to its lower position. The spring 36 biases the saw assembly 38 to pivot about the chopping axis 24 to its uppermost position. In this position, the pivotal guard 54 encloses the lower edge of the cutting blade 28. As the saw assembly is pivoted downwardly towards the circular table 4, the pivotal guard actuating mechanism causes the guard 54 to retract into the fixed guard 52, exposing the lower cutting edge of the blade 28.

SUMMARY

Accordingly, there is provided a saw comprising a base assembly, a saw assembly pivotally mounted on the base assembly which is capable of pivoting towards or away from the base to a cut a work piece located on the base assembly, a motor mounted within the saw assembly, and a drive spindle rotatably driven by the motor via a drive mechanism. The drive mechanism comprises a rotatable output shaft, a first drive wheel mounted on the output shaft, a rotatable intermediate shaft parallel to the output shaft, a first driven wheel mounted on the intermediate shaft, a first drive belt wrapped around the first drive wheel and first driven wheel to transfer rotary motion of the output shaft to the intermediate shaft, a second drive wheel mounted on the intermediate shaft, a second driven wheel mounted on the drive spindle, and a second drive belt wrapped around the second drive wheel and second driven wheel to transfer rotary motion of the intermediate shaft to the drive spindle, the drive spindle being parallel to the output shaft.

Such an arrangement provides a compact construction for a saw. While it will be appreciated that the output shaft in the embodiment below is the armature shaft of the motor, it is clear that the output shaft could be driven indirectly by the motor, for example, via gears.

BRIEF DESCRIPTION OF THE DRAWINGS

An embodiment of the present invention will now be described with reference to the accompanying drawings of which.

DETAILED DESCRIPTION

An embodiment of the present invention will now be described with reference to FIGS. 2 to 11. The general construction of the saw in accordance with the present embodiment is similar to that disclosed in EP1772221. Where the same features are disclosed in FIGS. 2 to 11 which have been previously disclosed in FIG. 1, the same reference numbers have been used.

The saw comprises a base 2 in which is mounted a circular table 4. The circular table 4 can rotate about a vertical axis. An arm 6 is attached to the front of the circular table 4 which may extend through a recess 8 formed in the front of the base 2 and then forward of the base 2. As the circular table rotates, the arm 6 preferably swings within the recess 8, the maximum amount of pivotal movement preferably being limited by the sides 10 of the recess 8. A latch 12 may be attached to the underside of the end of the arm 6 which is capable of releasably locking the angular position of the arm 6 within the recess 8 in well known manner.

A fixed fence 14 is rigidly attached to the base 2 and passes over the circular table 4. A sliding fence 208 is preferably slideably mounted on top of the fixed fence 14 which is capable of sliding in the direction of arrow M.

Pivotally attached to the rear of the circular table 4 is a bevel support 16. The bevel support 16 can pivot about a horizontal bevel axis. The bevel support 16 can be locked in a range of angular positions relative to the circular table 4 using a locking handle 20.

Pivotally mounted onto the bevel support 16 is a slide support 22. The slide support 22 can pivot about a chopping axis which is parallel to the axis of rotation of a cutting blade 28.

Rigidly mounted within the slide support 22 are preferably the ends of two straight rods 30, 32. Slideably mounted onto the two rods 30, 32 is a saw assembly 38.

Figure 4:
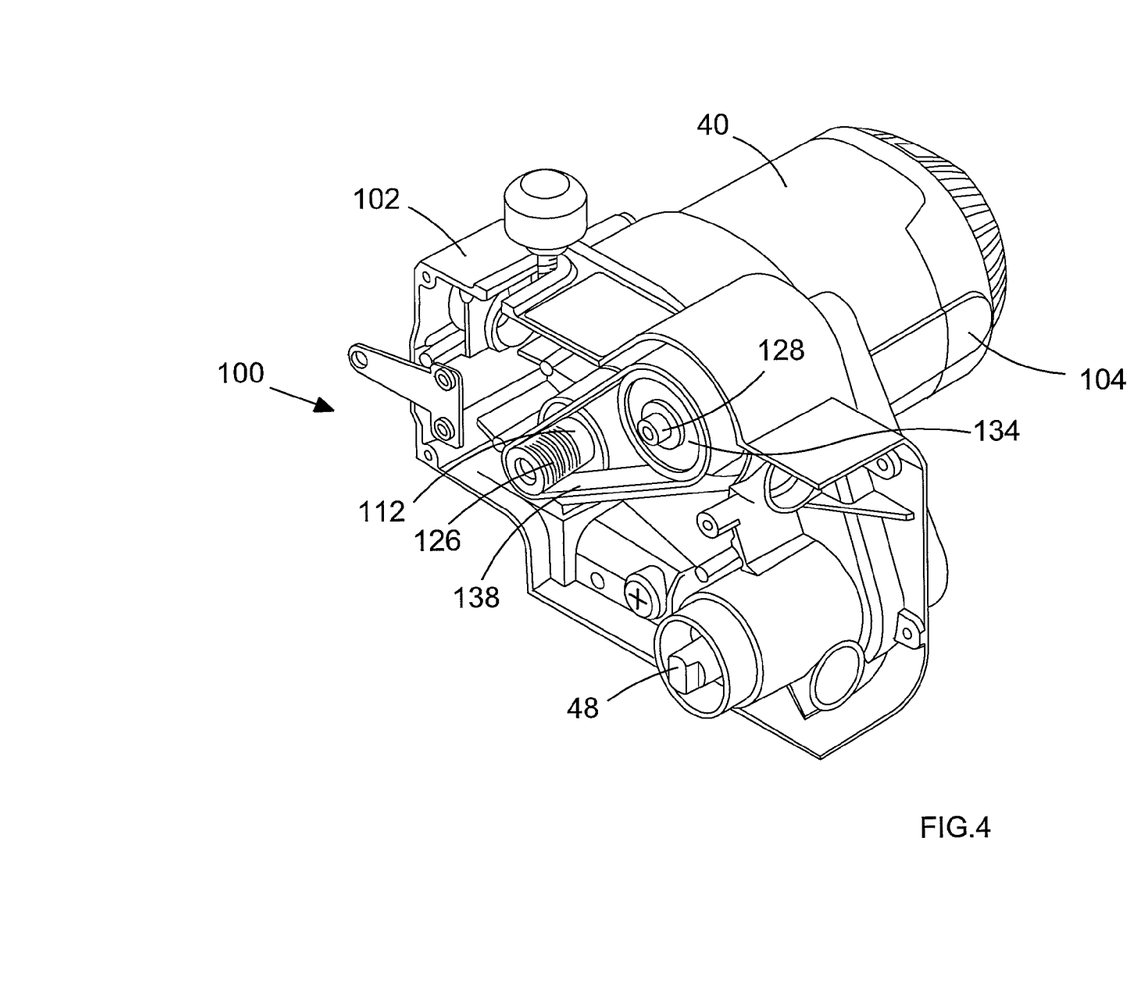
FIG. 4 shows a perspective view of the motor unit from a first side.
Figure 5:
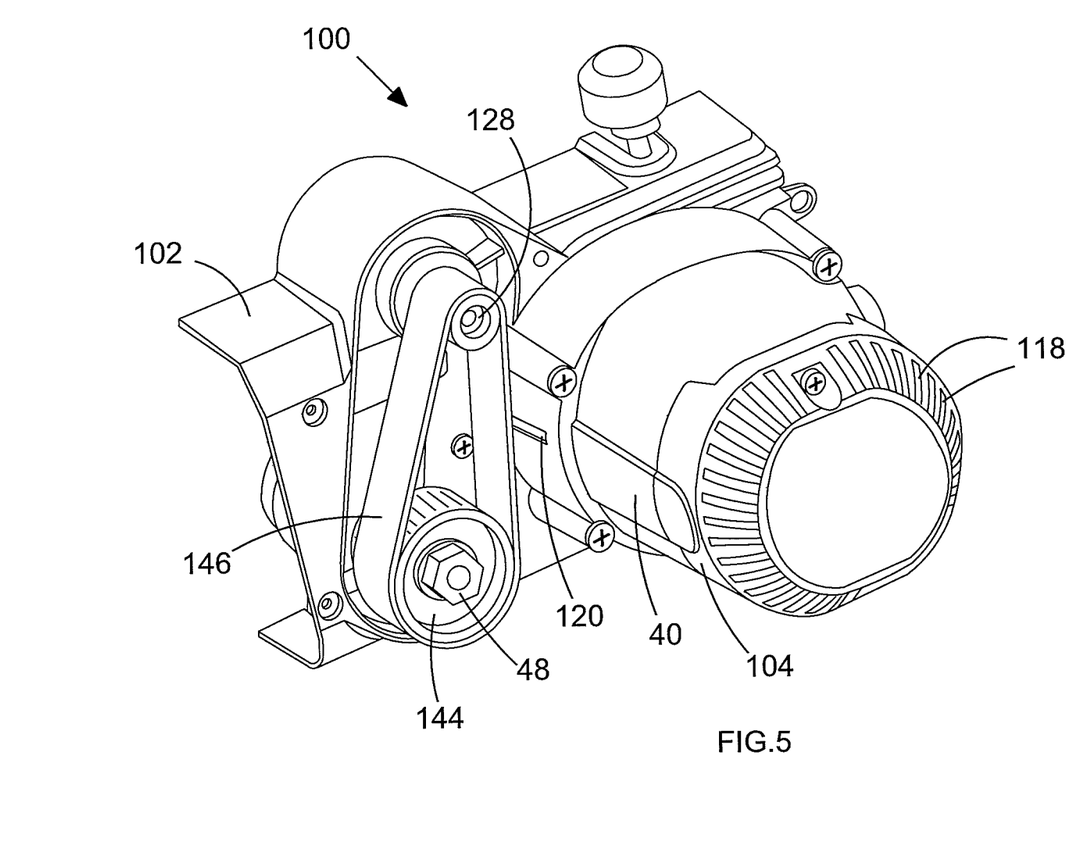
FIG. 5 shows a perspective view of the motor unit from a second side.
Figure 6:
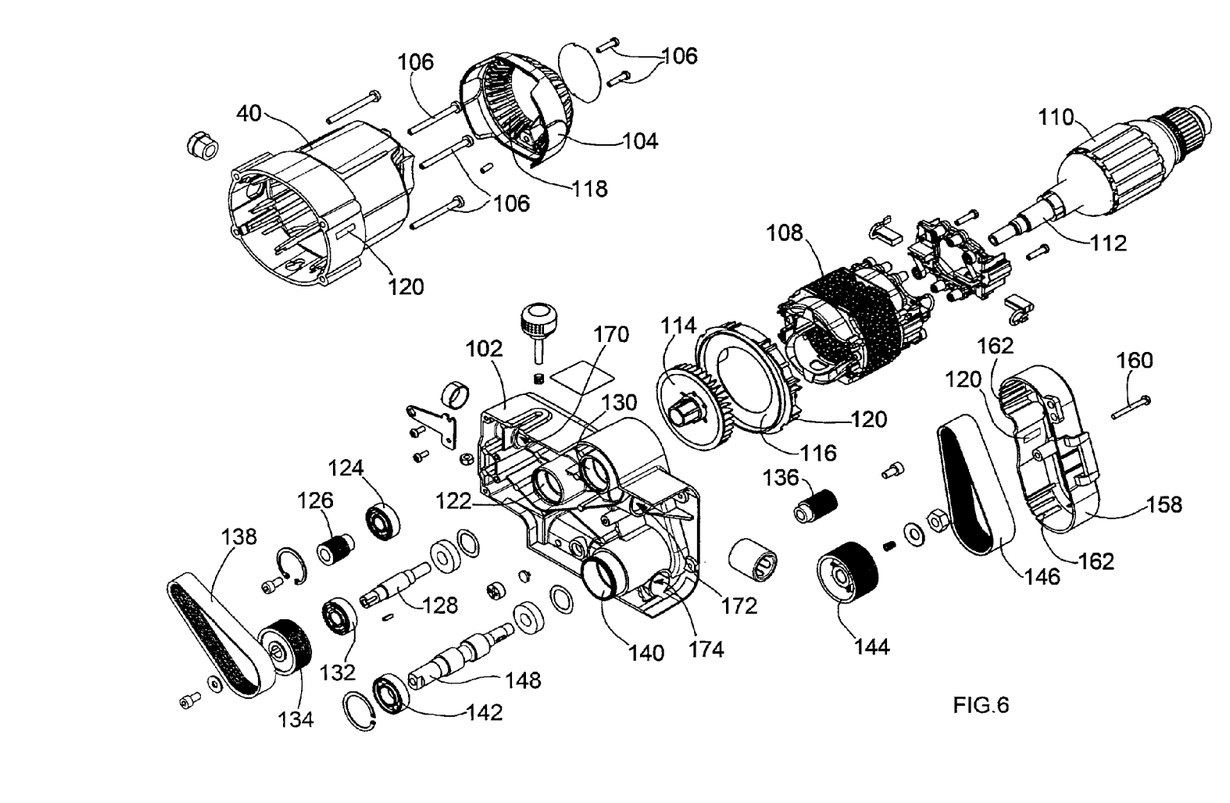
FIG. 6 shows an exploded view of the motor unit.

Referring to FIGS. 2B, 4, 5 and 6, the saw assembly 38 comprises a motor unit 100 as shown in FIGS. 4 to 6. The motor unit 100 may comprise three housings, namely a base housing 102, the motor housing 40 and an end cap 104, which are connected together using bolts 106. A motor is mounted within the motor housing 40 and comprises a stator 108 and an armature 110 rotatably mounted within the stator 108. The armature comprises an output shaft 112 by which the rotary motion of the motor is provided to the saw.

A radial fan 114 may be rigidly fixed to the output shaft 112 for drawing air over the motor. The fan 114 preferably locates inside a guide ring 116 which is rigidly mounted in the end of the motor housing 40. The fan 114 may draw in air through holes 118 form through the end cap 104, across the armature 110 and stator 108 and then expels it side ways through holes 120 formed through the side of the guide ring and motor housing 40 as indicated by arrows shown in FIG. 10.

The output shaft 112 may project into the base housing 102 through an aperture 122 in the base housing 102. The output shaft 112 is preferably supported by a bearing 124 located within the aperture 122. A first drive wheel 126 may be rigidly mounted on the end of the output shaft 112 inside of the base housing 102.

An intermediate shaft 128 is preferably mounted within a second aperture 130 formed through the base housing 102. The intermediate shaft 128 may be supported by a second bearing 132 located within the aperture 130 and is parallel to the output shaft 112. Located on the end of the intermediate shaft 128 inside of the base housing 102 is a first driven wheel 134. A rubber belt 138 is preferably wrapped tightly around the first drive wheel 126 and the first driven wheel 134 and frictionally engages with them so that rotation of the drive wheel 126 is transferred to the driven wheel 134 via the rotation of the belt 138. As such rotation of the output shaft 112 is transferred to the intermediate shaft 128.

The diameter of the first drive wheel is preferably smaller that that the first driven wheel and therefore the rate of rotation the intermediate shaft 128 is reduced when compared to that of the output shaft 112.

Mounted rigidly on the other end of the intermediate shaft 128 outside of the base housing is a second drive wheel 136. A drive spindle 48 is preferably mounted within a third aperture 140 formed through the base housing 102. The drive spindle 48 may be supported by a third bearing 142 located within the aperture 130 and is parallel to the output shaft 112. Located on the end of the drive spindle 48 outside of the base housing 102 is a second driven wheel 144. A second rubber belt 146 is preferably wrapped tightly around the second drive wheel 136 and second driven wheel 144 and frictionally engages with them so that rotation of the second drive wheel 136 is transferred to the second driven wheel 144 via the rotation of the second belt 146. As such rotation of the intermediate shaft 128 is transferred to the drive spindle 48.

The diameter of the second drive wheel 136 is preferably smaller that that the second driven wheel 144 and therefore the rate of rotation of the drive spindle 48 is reduced when compared to that of the intermediate shaft 128.

As such rotation of the output shaft 112 is transferred to the drive spindle via the two belts, the speed of the drive spindle 48 being considerably reduced compared to that of the output shaft 112.

Each of the belts 146, 138 can be slightly elastically deformed in a lengthwise direction allowing for impacts and sudden torque changes experienced by the blade during a cutting operation to be damped by the transmission system comprising the belts, thus protecting the motor.

The open end of the base housing 102 may be sealed by a first side housing 150 which is rigidly attached to the base housing 102. The first belt 138 is enclosed within the base housing by the first side housing 102. By enclosing the belt 138, no dust or debris generated during the operation of the saw can enter the base housing and interfere with the operation of the belt. The second belt 146 is preferably located outside of the base housing and is enclosed by a cover 158 which is attached to the base housing using a bolt 160. A hole 152 is formed through the side housing through which the drive spindle 48 projects. A blade 28 can be rigidly mounted on the drive spindle 48 using two side plates 154 and a clamp nut 156.

Figure 10:
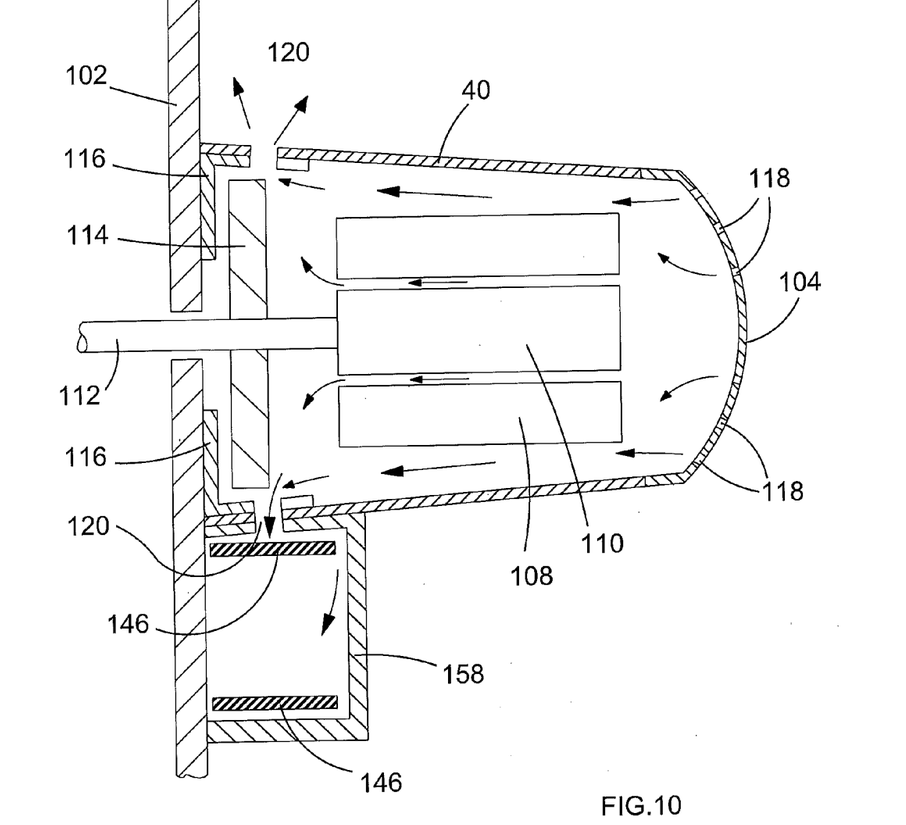
FIG. 10 shows a schematic diagram of the air flow across the motor.

An aperture 120 may be formed through the side of the cover 158 which aligns with the apertures 120 in the side of the guide ring and motor housing 40 when it is attached to the base housing 102 as best seen in FIG. 10. Air is blown by the fan 114 into the cover 158 and across the belt (as shown in FIG. 10) before being expelled through vents 162 in the cover 158. The flow of air across the belt 146 reduces the operating temperature of the belt 146 by about 15 to 20 degrees centigrade.

The base housing 102 slideably mounts onto the two guide rods 30, 32 which are rigidly mounted to the slide support 22. The rods 30; 32 are prevented from sliding or rotating within the slide support 22. The rods 30, 32 are located in a vertical plane with one being above the other, and are parallel to each other. The top rod 30 passes through two tubular passageways 170, 172 formed within the base housing 102 as best seen in FIG. 6. The lower rod 32 locates in a third tubular passageway 174 within the base housing 102. The base housing 102 can freely slide along the two rods 30, 32.

Figure 8:
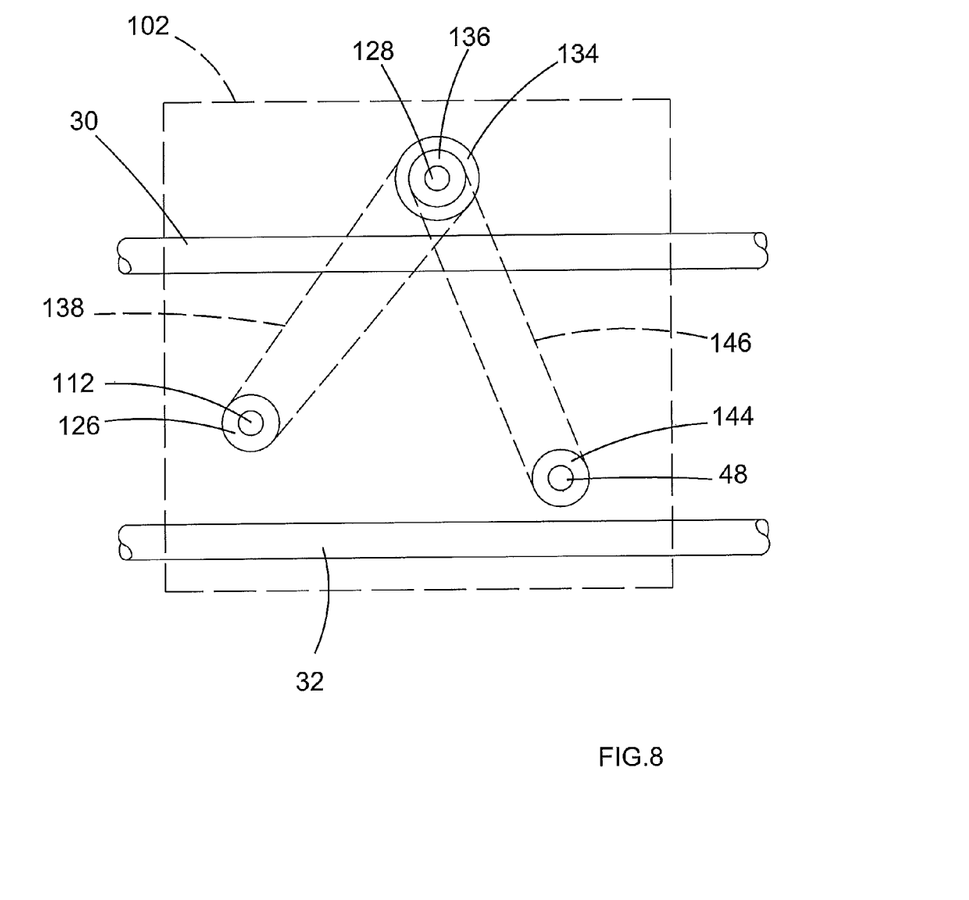
FIG. 8 shows a schematic view of the base housing mounted on the two guide rods.

Referring to FIG. 8 which shows a schematic view of the base housing 102 mounted on the two guide rods 30, 32, the output shaft 112 preferably passes between the two guide rods 30, 32, in a direction perpendicular to the plane within which the rods 30, 32 are located, the first belt 138 being located on the opposite side of the plane within which the rods 30, 32 are located to the motor. The intermediate shaft 128 is located above and passes over the two guide rods 30, 32 in a direction perpendicular to the plane within which the rods 30, 32 are located, the second belt 146 being located on the opposite side of the plane within which the rods 30, 32 are located to the first belt 138. The drive spindle 48 passes between the two guide rods 30, 32 in close proximity to the lower rod 32 in a direction perpendicular to the plane within which the rods 30, 32 are located, the blade being located on the opposite side of the plane within which the rods 30, 32 are located to the motor. This provides a compact arrangement while maximising the depth of cut.

The first side housing 150, which is rigidly attached to the base housing 102, may attach to a second side housing 180 using bolts 184 to form the fixed guard 52 and a dust chute 182. During the cutting operation, dust and debris are preferably driven through the dust chute 182 by the rotary motion of the cutting blade 28. An inner wall 186 is mounted within the first and second side housings to assist in guiding the dust and debris. A separate vacuum cleaner can be attached to the chute 182 to assist in the removal of the dust and debris.

Figure 7:
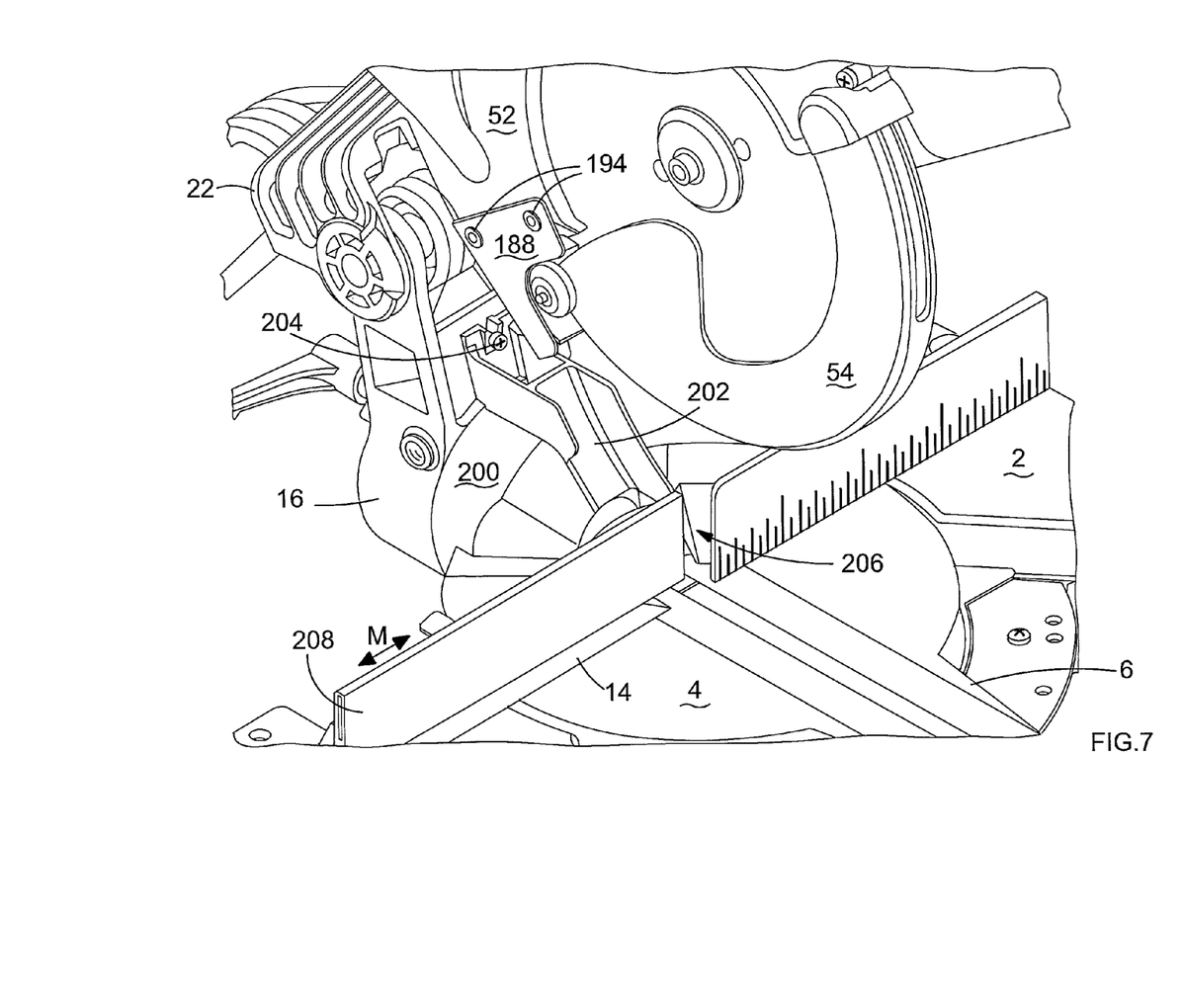
FIG. 7 shows a perspective view of the dust extraction arrangement.

A rubber chute 188 is preferably attached to lower rear end of the fixed guard 52 by the insertion of pegs 190 attached to the fixed guard 58 locating within holes 192 formed in the rubber chute and then being secured using clips 194 which attach to the ends of the pegs 190 as best seen in FIG. 7. The rubber chute assists in guiding dust and debris generated by the cutting action of the blade at the rear of the blade into the fixed guard 52 and towards the dust chute 182. When the saw assembly 38 is located in its lowest position, the rubber chute 188 extends downwardly to a position where it is just able to pass of over the fixed and moveable fences 14, 208 as the saw assembly slides back and fourth on the rods 30, 32.

The bevel support 16 preferably attaches to the rear of the circular table 4 adjacent a circular support 200 integrally formed with the circular table 4. Attached to the bevel support 16 using a screw 204 is a plastic guide chute 202 and which faces towards the rear of the blade. When the saw assembly 38 is located in its lowest rearward position, the rubber chute 188 is located behind the fence 14 in alignment with the plastic chute 200 so that the rubber chute 188 and plastic guide chute act as a single combined chute. When the saw assembly 38 is located in its lowest rearward position, the rear lower part of the saw blade 28 passes through the centre gap 206 of the fence 214 and rearwardly of the fence 14 in close proximity of the plastic guide chute 202. The combined chute acts to guide dust and debris generated by the cutting action of the blade 28 at the rear of the blade into the fixed guard 52 and towards the dust chute 182.

Figure 9:
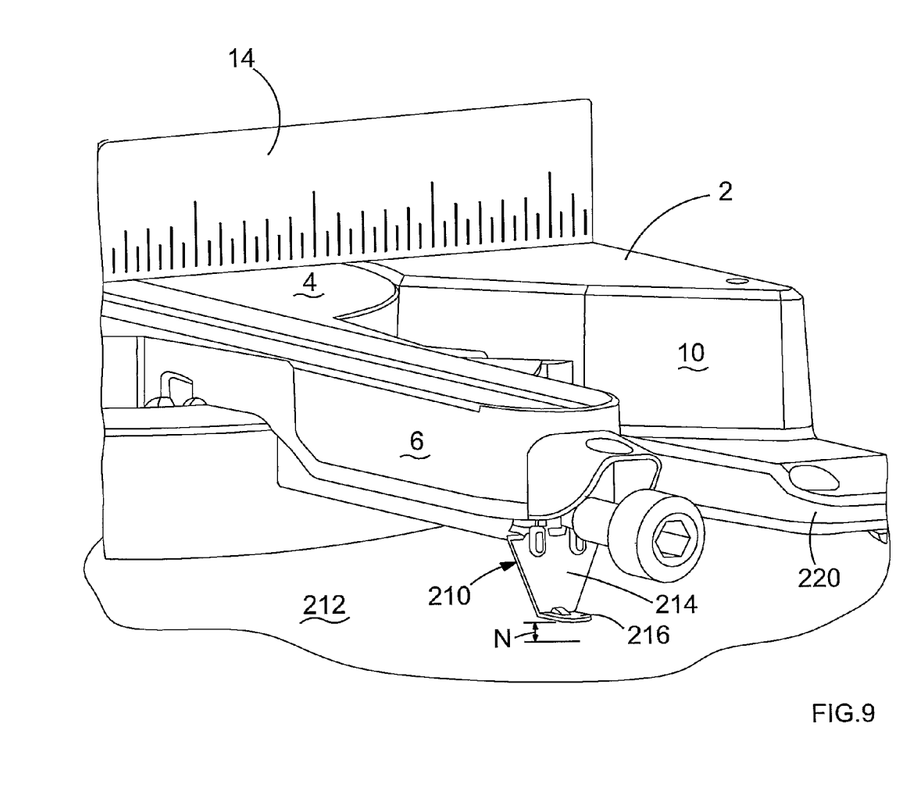
FIG. 9 shows a perspective view of the arm support mechanism.

The arm 6, which extends forward of the base 2, may have an L-shaped support 210 attached to its underside of the end of the arm remote from the circular table 6 using screws 218 as best seen in FIG. 9. The L-shaped support 210 comprises a vertical plate 214 and a perpendicular horizontal plate 216 connected to its lower end. When the saw is located on a flat work surface 212, the horizontal plate 216 is located 4 mm above the work surface 21 indicated by arrow N. When the saw assembly is located in its forwardmost position, remote from the bevel support 16, with the blade located at its further extent towards the end of the arm 6 remote from the circular table 4, and a downward pressure is being exerted to cut a work piece, there is a force exerted onto the saw which can cause it to tip forward. In such circumstances the arm 6 will pivot forwards until the L-shaped support 210 engages with the work surface 212 preventing any further movement.

Figure 11:
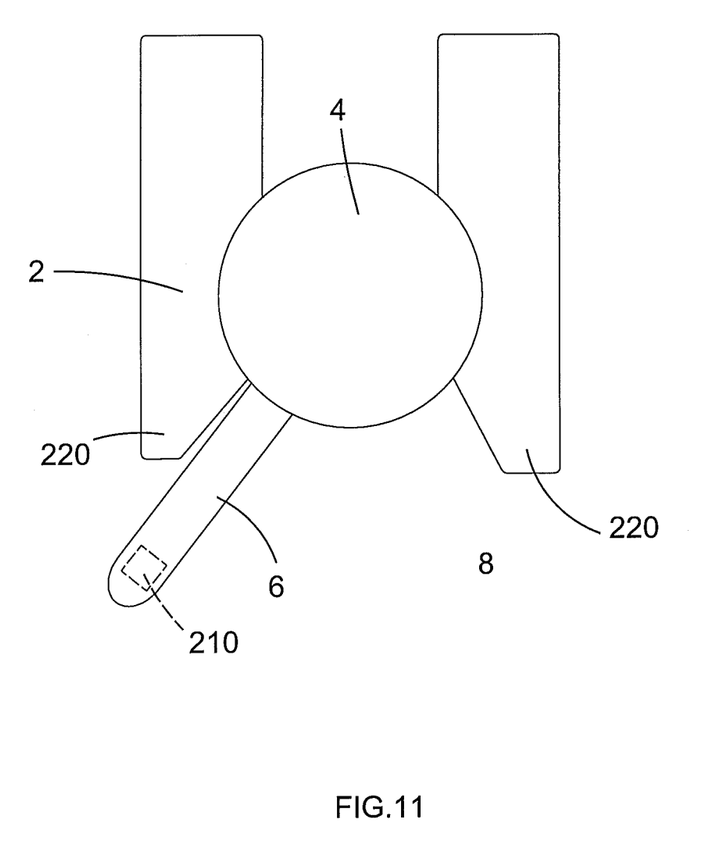
FIG. 11 shows a schematic diagram of the arm located in one of its extreme angular positions within the recess.

Under normal circumstances it is desirable that the arm 6 and support 210 be located above the work surface to enable them to be freely rotated within the base 2 bout a vertical axis. The length of the arm 6 and the location of the L-shaped support 210 on the arm 6 are such that when the arm 6 is pivoted to its extreme angular positions within the recess 8, the L-shaped support 210 is able to pass in front of and locate forward of the front side sections 220 of the base 2 as shown in FIG. 11.

A light aperture 240 is preferably formed in the top of the fixed guard 52. A light unit 242 comprising an LED may be mounted on the outside of the fixed guard 52 so that the light of the LED shines through the light aperture 240 inside of the fixed guard, the light passing on either side of the blade 28. When the pivotal guard 54 is retracted inside of the fixed guard 54, the light is able to pass the blade 28 and shine onto the circular table 4 and arm 6, the blade 28 casting a shadow on the circular table 4 and arm 6. When a work piece is located on the circular table 4 and arm 6, the shadow is cast onto the work piece and provides an indication of where the blade 28 will contact the work piece when it is moved towards the work piece to cut it.

A power supply 244 is to the top of the saw assembly and connects to the light unit via a cable 246. A switch 248 on the power supply 244 is used to switch the LED on and off. The power supply 244 is powered by electricity provided through the cable 42.

Figure 3:
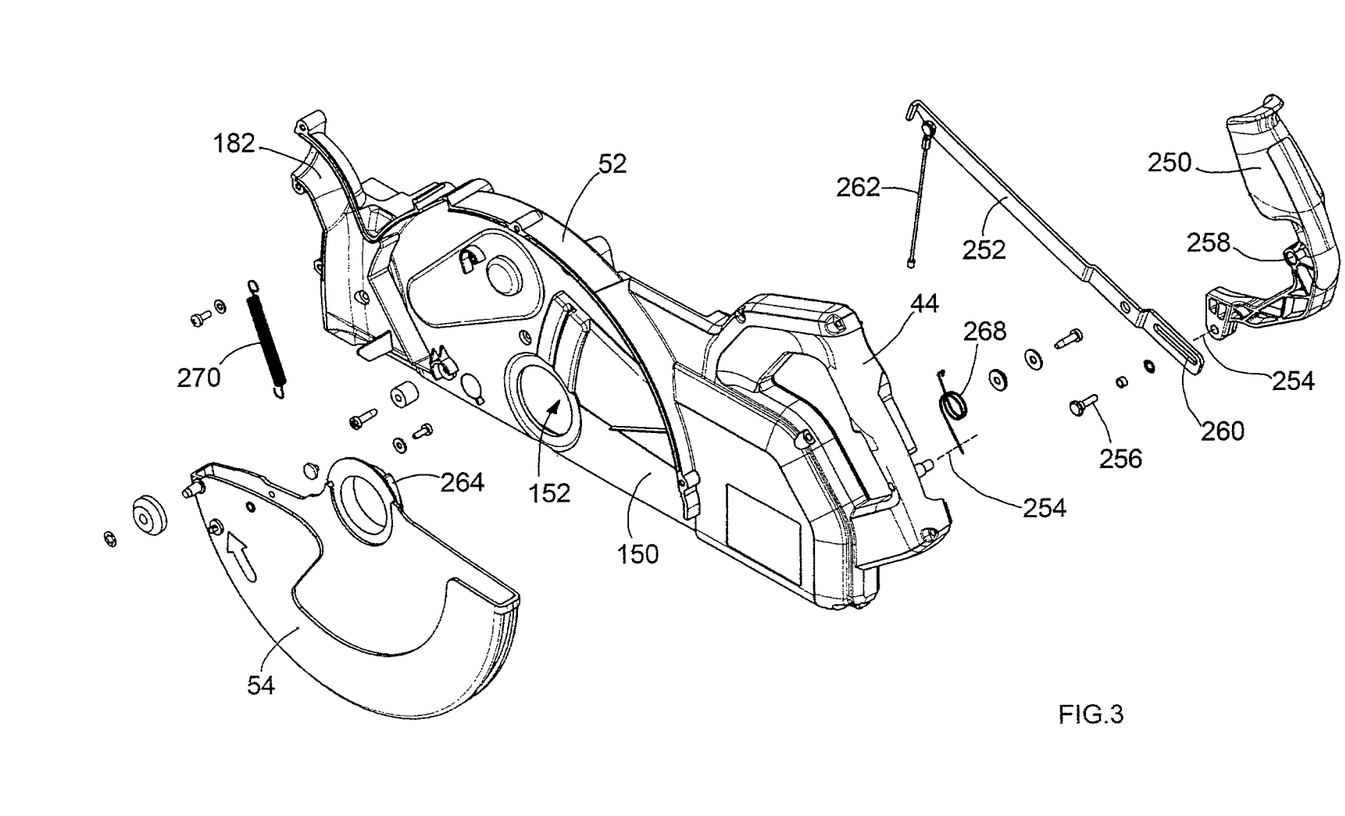
FIG. 3 show an exploded view of the pivotal and fixed guard mechanism of the embodiment.

The pivotal guard 54 is pivoted inside the fix guard 52 using a guard actuation mechanism comprising a lever 250 pivotally mounted on the handle 44 about an axis 254, an elongate rod 252 pivotally attached at one end to the lever 250 via a bolt 256 which passes through a slot 260 formed in the rod 252 and screws into a threaded recess 258 and which is axially slideable within the saw assembly, and a cable 262 attached to the other end of the elongate rod 252 and to the pivotal guard. The cable 262 preferably wraps around a circular inner wall 264 formed on the pivotal guard 52 before attaching to it. Pivotal movement of the lever 250 results in a sliding movement of the elongate rod 252 which in turn pulls on the cable 262. As the cable is wrapped around the inner wall, as it is pulled it causes the pivotal guard to rotate thus pivoting it inside of the fixed guard and exposing the blade 28. A spring 268 biases the lever 2590 away from the handle 44. A second spring 270 biases the pivotal guard shut. The slot 260 allows for movement of the guard 54 without movement of the lever 250.

The description of the invention is merely exemplary in nature and, thus, variations that do not depart from the gist of the invention are intended to be within the scope of the invention. Such variations are not to be regarded as a departure from the scope of the invention.

What is claimed is:

1. A saw comprising:
    a base assembly (2);
    a saw assembly (38) pivotally mounted on the base assembly capable of pivoting towards or away from the base assembly to cut a work piece located on the base assembly, wherein the saw assembly is slideably mounted onto two parallel guide rods (30, 32) which are pivotally mounted on the base assembly, the rods (30, 32) being located in a vertical plane with one being located above the other;
    a motor (108, 110) mounted within the saw assembly;
    a drive spindle (48) rotatably driven by the motor via a drive mechanism;
    the drive mechanism comprising a rotatable output shaft (112), a first drive wheel (126) mounted on the output shaft, a rotatable intermediate shaft (128) parallel to the output shaft, a first driven wheel (134) mounted on the intermediate shaft, a first drive belt (138) wrapped around the first drive wheel and first driven wheel for transferring rotary motion of the output shaft to the intermediate shaft, a second drive wheel (136) mounted on the intermediate shaft, a second driven wheel (144) mounted on the drive spindle, a second drive belt (146) wrapped around the second drive wheel and second driven wheel for transferring rotary motion of the intermediate shaft to the drive spindle, the drive spindle being parallel to the output shaft;
    wherein the first belt 138 is located on a first side of the plane within which the rods (30, 32) are located to the motor and the second belt 146 is located on a second side of the plane within which the rods 30, 32 are located opposite to the first belt 138.

2. A saw as claimed in claim 1 wherein the output shaft (112) passes between the two guide rods (30, 32) in a direction perpendicular to the plane within which the rods (30, 32) are located;
    where the intermediate shaft (128) is located above and passes over the two guide rods (30, 32) in a direction perpendicular to the plane within which the rods (30, 32) are located; and
    wherein the drive spindle (48) passes between the two guide rods (30, 32) in a direction perpendicular to the plane within which the rods 30, 32 are located.

3. A saw as claimed in claim 2 wherein the drive spindle 48 passes between the two guide rods (30, 32) in close proximity to the lower rod (32).

4. A saw as claimed in claim 1 wherein the first drive wheel is smaller than the first driven wheel.

5. A saw as claimed in claim 1 wherein the second drive wheel is smaller than the second driven wheel.

6. A saw as claimed in claim 1 wherein at least one of the first and second drive belts is elastically deformable in a lengthwise direction.

7. A saw as claimed in claim 3 wherein the guide rods are rigidly attached to a slide support (22) which is pivotally attached to the base assembly.

8. A saw as claimed in claim 7 wherein the slide support is pivotally mounted on a bevel support (16) which is pivotally attached to the base assembly.

9. A saw as claimed in claim 8 wherein the bevel support is pivotally attached to a circular table which pivotally mounted on the base assembly.

* * * * *